United States Patent
Fukuda et al.

(10) Patent No.: US 8,198,741 B2
(45) Date of Patent: Jun. 12, 2012

(54) WIND TURBINE GENERATOR SYSTEM INCLUDING CONTROLLER THAT PERFORMS CUT-OUT CONTROL

(75) Inventors: Mitsuyoshi Fukuda, Nagasaki (JP); Hideto Doi, Nagasaki (JP)

(73) Assignee: Mitsubishi Heavy Industries, Ltd., Tokyo (JP)

(*) Notice: Subject to any disclaimer, the term of this patent is extended or adjusted under 35 U.S.C. 154(b) by 602 days.

(21) Appl. No.: 12/309,607

(22) PCT Filed: Jan. 17, 2008

(86) PCT No.: PCT/JP2008/050492
§ 371 (c)(1),
(2), (4) Date: Jan. 23, 2009

(87) PCT Pub. No.: WO2008/093540
PCT Pub. Date: Aug. 7, 2008

(65) Prior Publication Data
US 2010/0001526 A1    Jan. 7, 2010

(30) Foreign Application Priority Data
Jan. 29, 2007    (JP) .................................. 2007-017636

(51) Int. Cl.
*F03D 9/00* (2006.01)
(52) U.S. Cl. .......................................... 290/44; 290/55
(58) Field of Classification Search .................... 290/44, 290/55
See application file for complete search history.

(56) References Cited

U.S. PATENT DOCUMENTS

| | | | |
|---|---|---|---|
| 7,436,083 B2 * | 10/2008 | Shibata et al. | 290/44 |
| 7,692,322 B2 * | 4/2010 | Wakasa et al. | 290/44 |
| 2005/0042093 A1 | 2/2005 | Yoshida | |
| 2006/0002793 A1 | 1/2006 | Yoshida | |
| 2007/0205602 A1 * | 9/2007 | Willey et al. | 290/44 |

FOREIGN PATENT DOCUMENTS

| | | |
|---|---|---|
| JP | H11-072502 | 3/1999 |
| JP | 2002-048050 | 2/2002 |
| JP | 2003-194604 | 7/2003 |
| JP | 2004-084527 | 3/2004 |
| JP | 2005-054752 | 3/2005 |
| JP | 2006-016984 | 1/2006 |
| WO | WO 2005/083266 A1 * | 9/2005 |

* cited by examiner

*Primary Examiner* — Tho D Ta
(74) *Attorney, Agent, or Firm* — Manabu Kanesaka; Kenneth M. Berner; Benjamin J. Hauptman

(57) ABSTRACT

A wind turbine generator system includes, in a nacelle mounted atop a tower, a main shaft that is coupled to a rotor head to which wind turbine blades are attached and that integrally rotates therewith, a gear box accelerating and outputting the rotation speed of the main shaft, a generator driven by the output of the gear box, and a controller that performs cut-out control during strong wind when a measured value from an anemometer is a predetermined level or more. The controller is configured to decide that the anemometer has a fault when a difference of a predetermined level or more occurs between the measured value from the anemometer and an estimated wind speed value obtained from a relationship between a blade-pitch-angle of the wind turbine blades and an output of the generator.

4 Claims, 5 Drawing Sheets

WIND TURBINE GENERATOR SYSTEM INCLUDING CONTROLLER THAT PERFORMS CUT-OUT CONTROL

TECHNICAL FIELD

The present invention relates to a wind turbine generator system using a wind turbine that converts natural wind power to rotary power for generating electricity.

BACKGROUND ART

Wind turbine generator systems generating electricity using wind power, which is natural energy, have been conventionally known. This type of wind turbine generator system includes a rotor head to which wind turbine blades are attached, a main shaft coupled to the rotor head so as to integrally rotate with the rotor head, a gear box coupled to the main shaft that rotates by means of wind power received by the wind turbine blades, and a generator driven by a shaft output from the gear box, which are provided in a nacelle mounted atop a tower. In the thus configured wind turbine generator system, the rotation of the main shaft and the rotor head provided with the wind turbine blades that convert wind power to rotary power generates shaft output. The output of the shaft whose rotational speed is stepped-up by the gear box coupled to the main shaft is transmitted to the generator. Accordingly, the shaft output obtained by converting wind power to rotary power works as the driving source of the generator, and thereby electricity can be generated using wind power as the motive energy of the generator.

The above-described known wind turbine generator system automatically starts or stops in response to a signal of a wind speed value measured with an anemometer.

In particular, when wind is strong such that the wind speed value is a certain level or more, cut-out control where the electricity generation is stopped by changing the pitch angles of the wind turbine blades is carried out to protect the system (for example, see Patent Document 1).

Patent Document 1: Japanese Unexamined Patent Application, Publication No. 2004-84527

DISCLOSURE OF INVENTION

In order to perform the above-mentioned cut-out control accurately, the measured value from the anemometer is important. That is, if the anemometer has some sort of fault, a large difference occurs between the actual wind speed and the measured value from the anemometer, making it impossible to achieve accurate cut-out control.

To give a specific example of the anemometer fault, for instance, in a wind turbine generator system placed at a region of heavy snowfall in an area with a cold climate, a measured value lower than the actual wind speed may be output because of icing of a wind speed detector, etc. in the anemometer. Such an error in the measurement causes underestimation of strong wind that requires implementing cut-out control and, therefore, is undesirable.

From this background, it is desired to perform cut-out control more accurately by providing a means of monitoring whether there is an abnormality related to t-he measured values from the anemometer.

The present invention has been made under the above circumstances, and an object of the invention is to provide a wind turbine generator system that can perform cut-out control more accurately by monitoring whether there is an abnormality related to the measured values from the anemometer.

The present invention employs the following solutions for solving the above-mentioned problems.

In a wind turbine generator system including, in a nacelle mounted atop a tower, a main shaft that is coupled to a rotor head to which wind turbine blades are attached and that integrally rotates therewith, a gear box accelerating and outputting the rotation speed of the main shaft, a generator driven by the output of the gear box, and a controller that performs cut-out control during strong wind when a measured value from an anemometer is a predetermined level or more, the controller is configured to decide that the anemometer has a fault when a difference of a predetermined level or more occurs between the measured value from the anemometer and an estimated wind speed value obtained from a relationship between a blade-pitch-angle of the wind turbine blades and an output of the generator.

In the wind turbine generator system of the present invention, since the controller decides that the anemometer has a fault when the difference of a predetermined level or more occurs between the measured value from the anemometer and the estimated wind speed value obtained from the relationship between the blade-pitch-angle of the wind turbine blades and the output of the generator, the fault of the anemometer can be reliably detected.

In the present invention, the controller preferably uses a detection value of outside air temperature for deciding that the anemometer has a fault. This allows reliable detection of a fault in the anemometer that is caused by icing of the anemometer due to a low outside air temperature.

In the present invention, the controller preferably performs the cut-out control when it is decided that the anemometer has a fault. This allows the cut-out control of the wind turbine generator system to be performed reliably.

In the wind turbine generator system of the present invention, by reliably detecting an abnormality with respect to measured values from the anemometer performing the cut-out control, in particular, even when the anemometer has an abnormality such that a value lower than the actual wind speed is outputted as the measured value due to, for example, icing, the cut-out control can be reliably performed to protect the wind turbine generator system from strong wind.

EXPLANATION OF REFERENCE SIGNS

Figure 1:
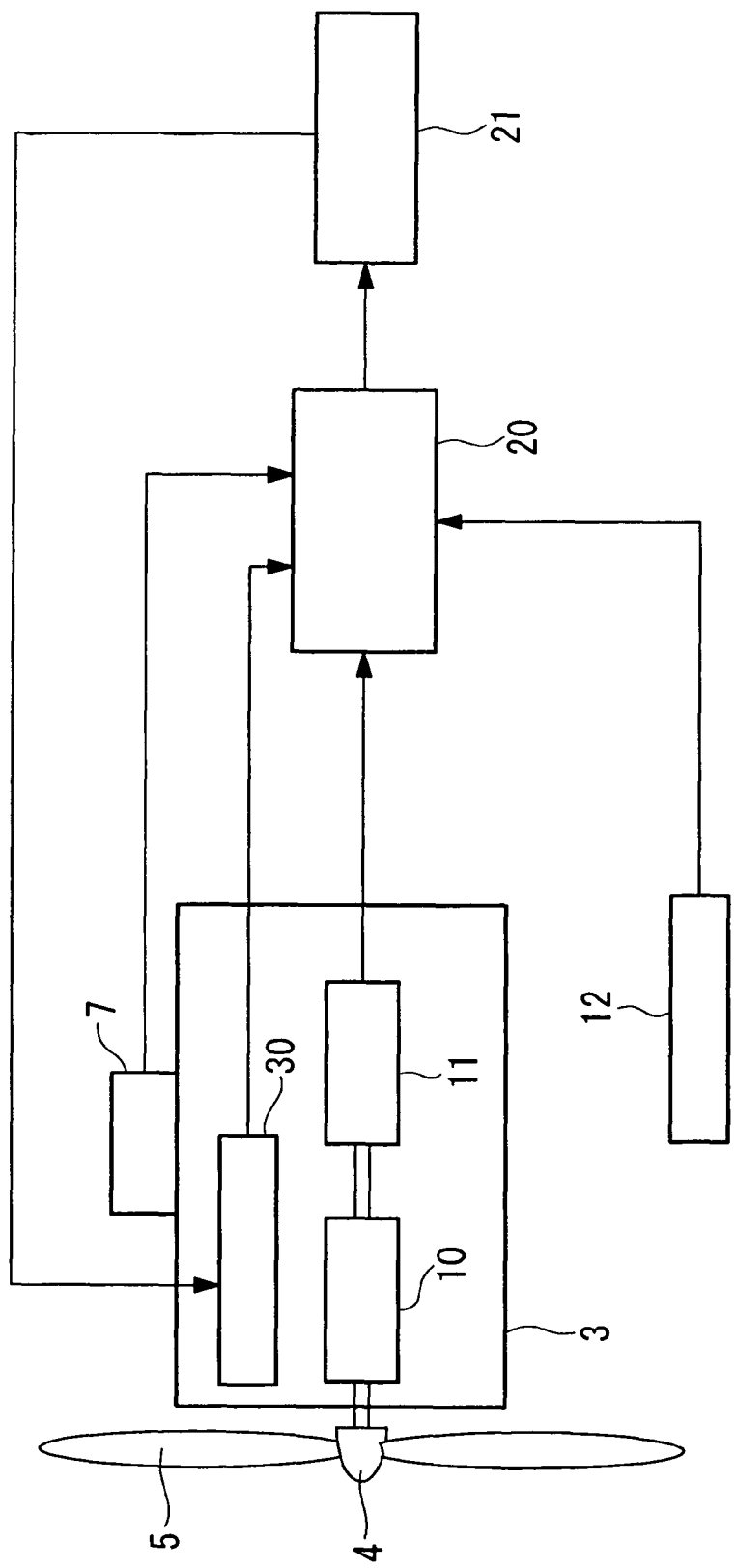
FIG. 1 is a block diagram showing a main portion of an embodiment of a wind turbine generator system according to the present invention.

1: wind turbine generator system
2: tower
3: nacelle
4: rotor head
5: wind turbine blade
7: anemometer
11: generator
12: outside air temperature sensor 20: controller
30: variable-pitch mechanism

BEST MODE FOR CARRYING OUT THE INVENTION

An embodiment of the wind turbine generator system according to the present invention will be described below with reference to the drawings.

Figure 2:
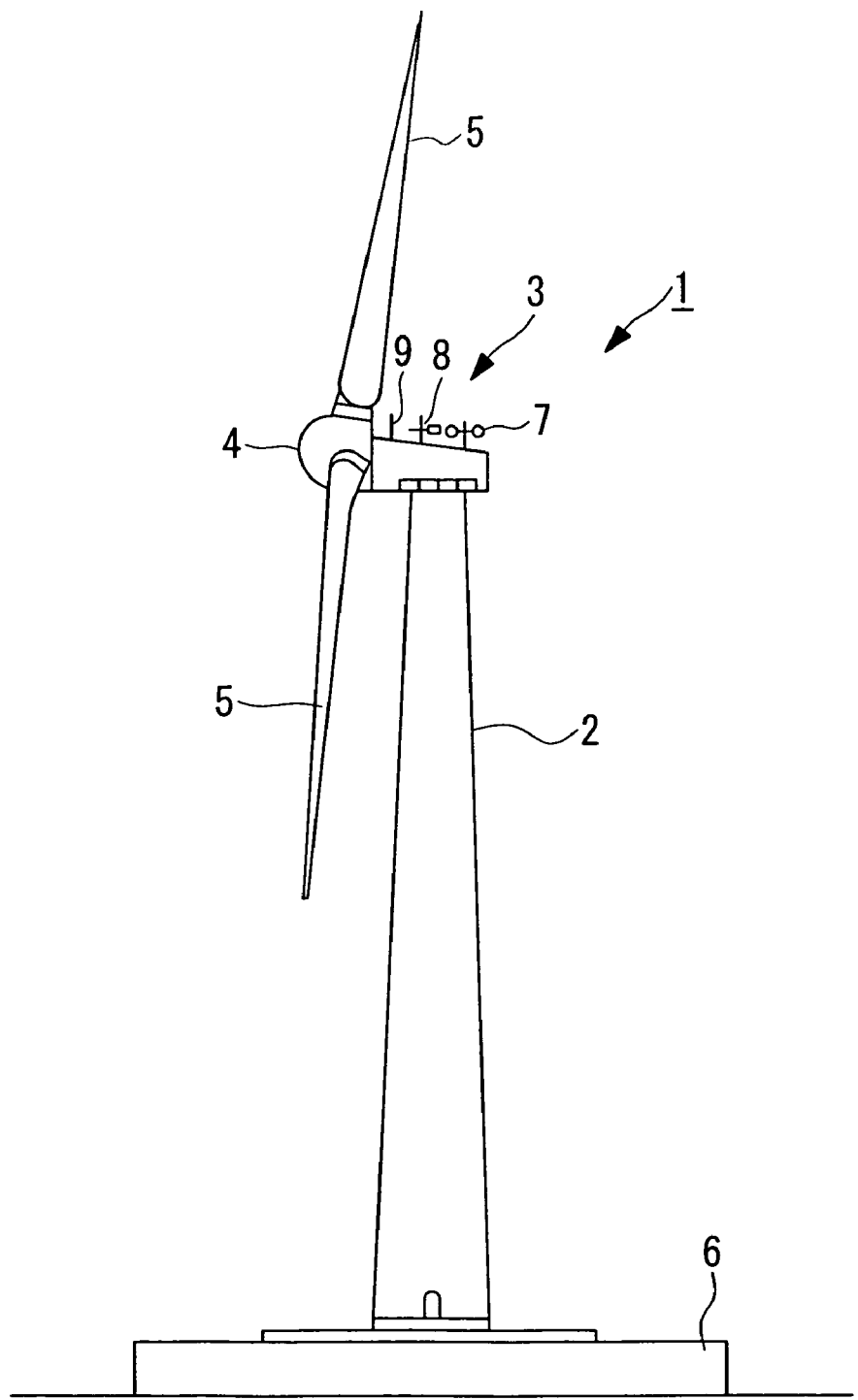
FIG. 2 is a diagram showing an example of the whole configuration of the wind turbine generator system.

As shown in FIG. 2, the wind turbine generator system 1 includes a tower 2 vertically installed on a base 6, a nacelle 3 mounted atop the tower 2, and a rotor head 4 provided on the nacelle 3 so as to be rotatable around an approximately horizontal axis.

The rotor head 4 is fitted with a plurality of wind turbine blades 5 that are arranged radially around the rotation axis thereof. As a result, the force of wind blowing against the wind turbine blades 5 from the direction of the rotation axis of the rotor head 4 is converted into motive energy causing the rotor head 4 to rotate around the rotation axis.

An anemometer 7 for measuring wind speed at the circumference, an anemoscope 8 for measuring wind direction, and a lightning rod 9 are provided at appropriate portions (for example, the upper side) on the external face of the nacelle 3.

A generator 11 coupled to the rotor head 4 via a gear box 10 coaxial therewith is provided inside the nacelle 3. That is, it is configured to obtain a generator output W from the generator 11 by stepping-up the rotation speed of the rotor head 4 with the gear box 10 and driving the generator 11.

As shown in FIG. 1, a controller 20 for performing various types of control is provided at an appropriate position in the wind turbine generator system 1. Control with this controller 20 includes starting and stopping of electricity generation, which is performed based on measured values from the anemometer 7, and cut-out control, which is performed when the wind is strong such that the measured value from the anemometer 7 is a predetermined level or more.

To the controller 20 are inputted an output signal of wind speed V measured with the anemometer 7, an output signal of detected generator output W generated by the generator 11, and an output signal of outside air temperature T measured with an outside air temperature sensor 12 disposed at an appropriate position.

Furthermore, the controller 20 is connected so as to be able to control a variable-pitch mechanism 30. The variable-pitch mechanism 30 is a mechanism that properly changes the pitch angle of the wind turbine blades 5 in response to various conditions, such as wind speed. In addition, the variable-pitch mechanism 30 can also perform the cut-out control operation for halting the rotation of the rotor head 4 by changing the pitch angle of the wind turbine blades 5 when it receives a cut-out signal 21 which the controller 20 outputs during strong wind.

The above-mentioned controller 20 performs the cut-out control during strong wind such that the wind speed V, as the measured value from the anemometer 7, is a predetermined level Vc or more and also decides that the anemometer has a fault when a difference of a predetermined value $\Delta V$ or more occurs between the wind speed V which is the measured value from the anemometer 7 and the estimated wind speed value Va obtained from a relationship between the blade-pitch-angle of the wind turbine blades 5 and the output W of the generator 11.

Figure 3:
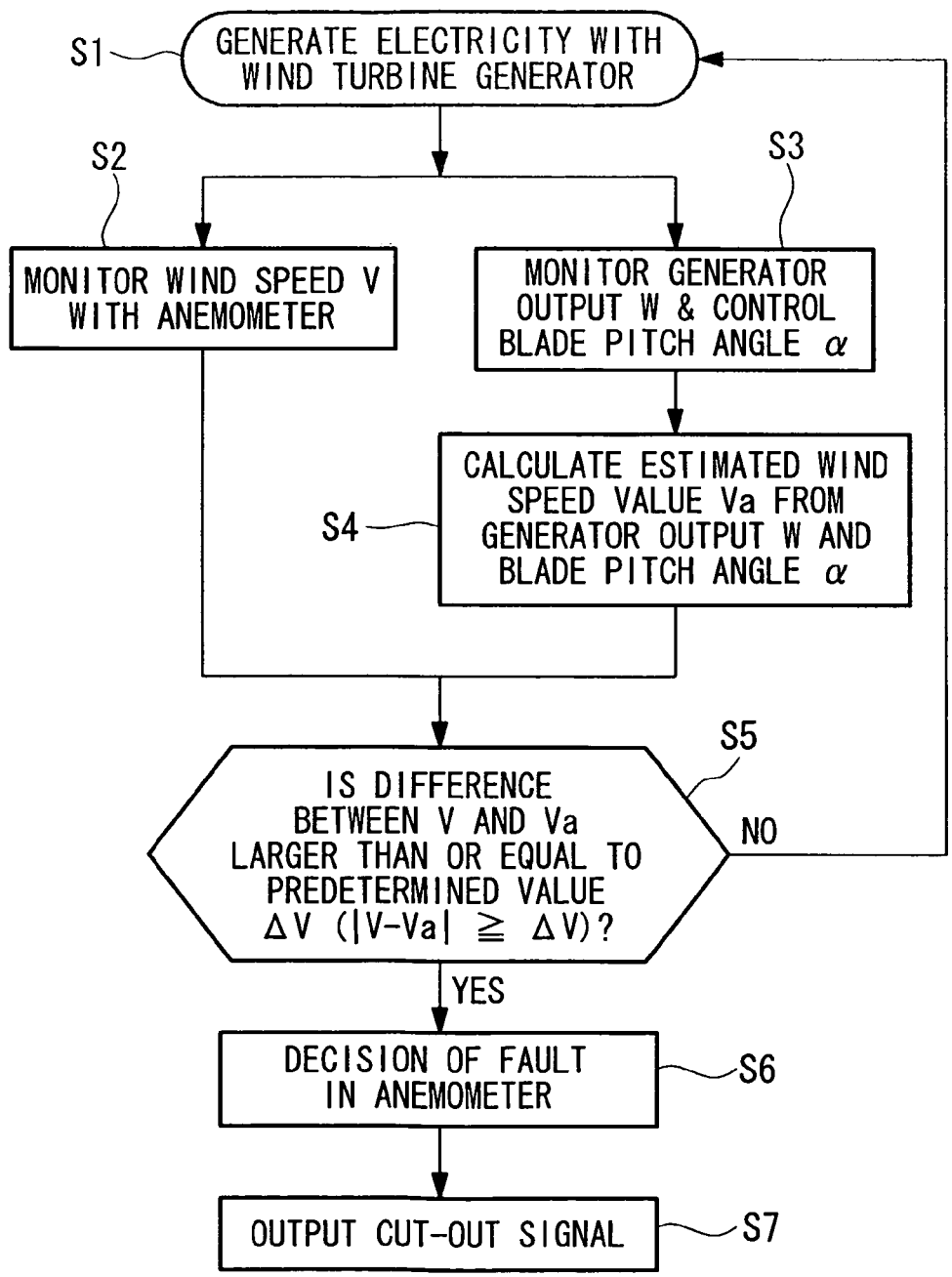
FIG. 3 is a flow chart showing decision of a fault in the anemometer in the controller of FIG. 1.

The decision process of the anemometer fault in the controller 20 will be specifically described with reference to the flow chart of FIG. 3.

In a first step S1, the wind turbine generator 1 is operated to generate electricity. During the generation of electricity, the wind speed V is continuously monitored in a step S2 by measuring the wind speed V with the anemometer 7 and inputting the data to the controller 20.

At the same time as monitoring of the wind speed in the step S2, the generator output W of the generator 11 is measured in a step S3 and is inputted to the controller 20. The generator output W is used for controlling the variable-pitch mechanism 30 that changes a pitch angle $\alpha$ of the wind turbine blades 5. That is, the variable-pitch mechanism 30 optimizes the pitch angle $\alpha$ of the wind turbine blades 5 based on the measured value of the generator output W.

Figure 4:
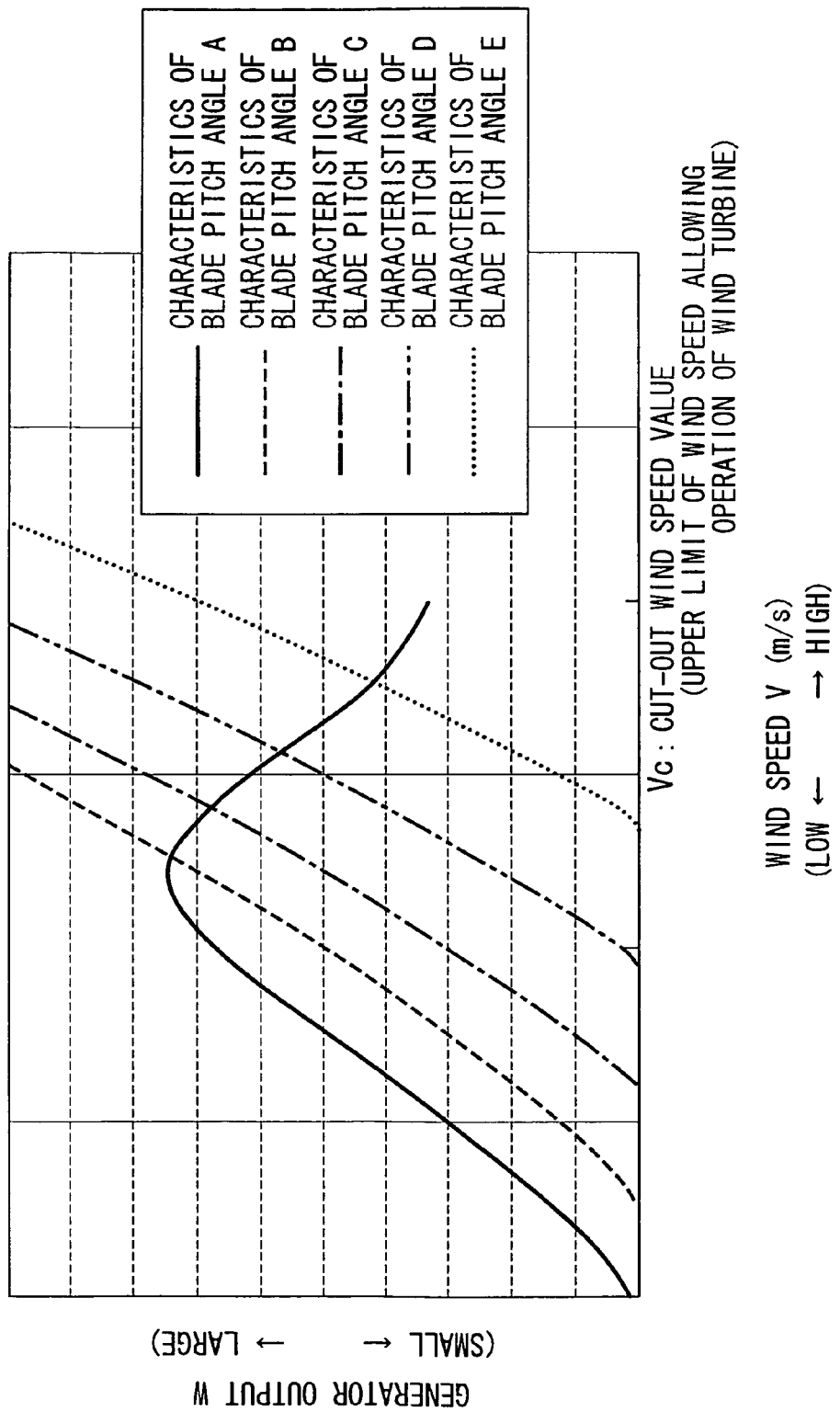
FIG. 4 is a graph showing the characteristics of wind turbine blades, in which a relationship between the wind speed V and the generator output W is shown for each blade-pitch-angle.

The generator output W and the pitch angle $\alpha$ obtained in the step S3 are used in the subsequent step S4 for calculating an estimated wind speed Va. This estimated wind speed Va is calculated based on, for example, the graph shown in FIG. 4. This graph shows the characteristics of the wind turbine blades 5 with the generator output W on the vertical axis and the wind speed V on the horizontal axis, and the generator output W obtained from the wind speed V is shown at each blade-pitch angle $\alpha$. Therefore, the wind speed V can be back-calculated if the generator output W and the pitch angle $\alpha$ are known. Accordingly, the wind speed back-calculated from the generator output W and the pitch angle $\alpha$ is defined as an estimated wind speed Va. That is, when the anemometer 7 is normal, in addition to the generator output W and the pitch angle $\alpha$, the wind speed V measured with the anemometer 7 and the estimated wind speed Va are approximately equal. Furthermore, in the characteristic of the wind turbine blades 5, a cut-out wind speed value Vc that indicates the upper limit of wind speed allowing operation of the wind turbine is defined.

Accordingly, in the subsequent step S5, the difference between the wind speed V and the estimated wind speed value Va is calculated, and it is decided whether the absolute value is larger than or equal to a predetermined value $\Delta V$ ($|V-Va|>\Delta V$). When the result shows that the absolute value of the difference between the wind speed V and the estimated wind speed value Va is larger than $\Delta V$ ("YES"), the process proceeds to the subsequent step S6, where it is decided that the anemometer 7 has some sort of fault. That is, under operating conditions where wind of wind speed V input from the anemometer 7 blows, if the actually inputted generation output W is different from the generator output calculated from the graph of FIG. 4 when the wind turbine generator system 1 is operated with the wind turbine blades 5 at a pitch angle $\alpha$, it is considered that the anemometer 7 has a fault thus outputting an inaccurate measured value.

If the wind turbine generator system 1 is continuously operated with the abnormality in the anemometer 7, a serious problem may occur. Therefore, a cut-out signal is outputted in the subsequent step S7. When the cut-out signal is outputted in this way, the variable pitch mechanism 30 is operated to change the blade-pitch angle $\alpha$ to a feathering angle. As a result, the rotational speed of the rotor head 4 and the generator output W are gradually decreased, with losing wind energy, finally reaching a standby state (awaiting cut-out reset).

Thus, the controller 20 decides that the anemometer has a fault when a difference of a predetermined value $\Delta V$ or more occurs between the estimated wind speed value Va obtained from the relationship between the blade-pitch angle $\alpha$ and the generator output W and the wind speed V which is the measured value from the anemometer 7. Therefore, the fault in the anemometer 7 can be reliably detected.

Figure 5:
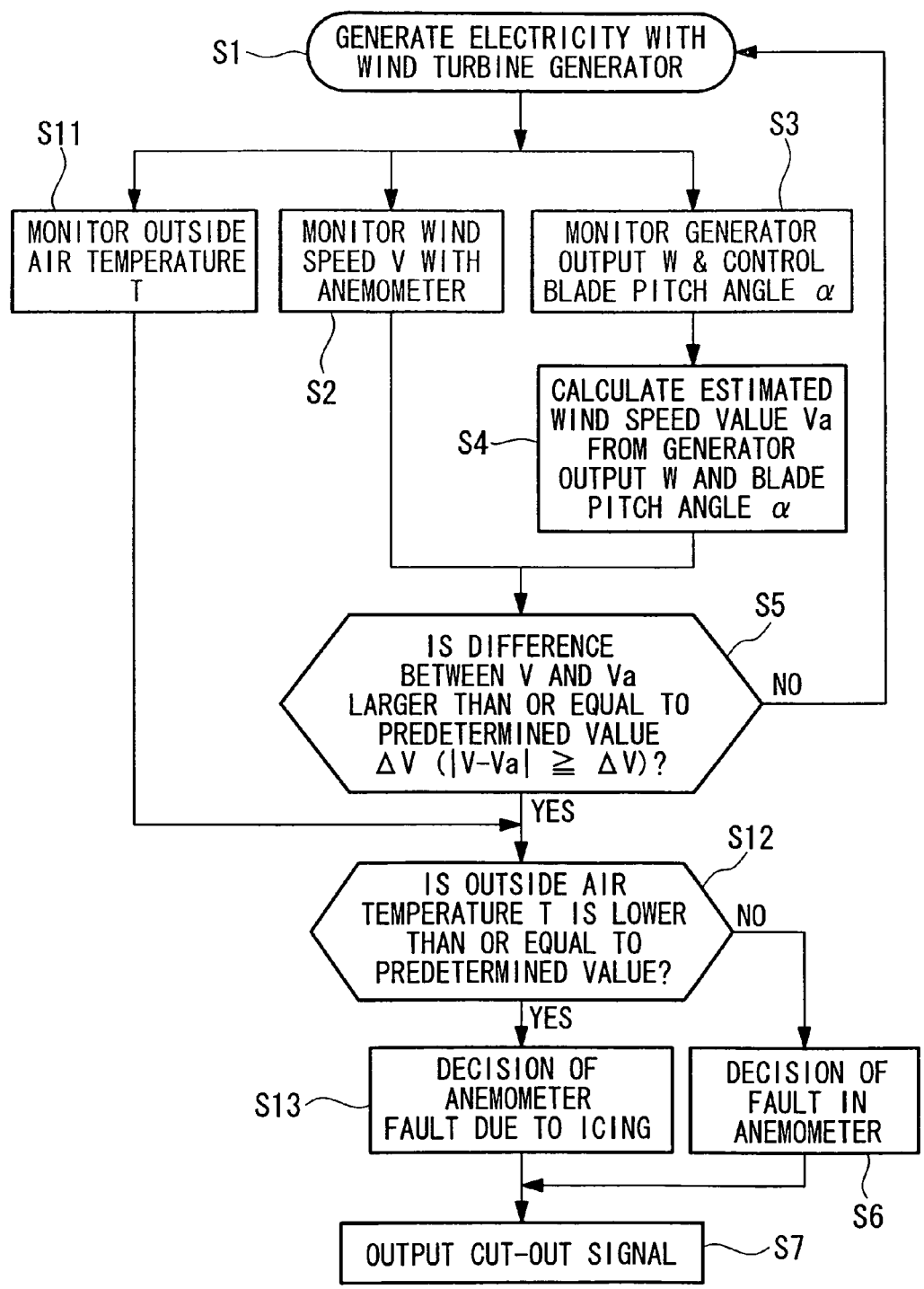
FIG. 5 is a flow chart showing a modification of FIG. 3.

The above-mentioned controller 20 can recognize a fault in the anemometer 7 caused by icing by using an outside air temperature T measured with the outside air temperature sensor 12 disposed at an appropriate position. The control for the controller 20 to decide a fault in the anemometer 7 caused by icing will be specifically described below with reference to the flow chart of a modification shown in FIG. 5. Portions similar to those in the flow chart of FIG. 3 are denoted by the same reference numerals and their detailed description is omitted.

In this control, the outside air temperature T is monitored with the outside air temperature sensor 12 in a step S11 at the same time as monitoring of the wind speed V in the above-mentioned step S2 and monitoring of the blade pitch angle α in the step S3.

When the absolute value of a difference between the wind speed V and the estimated wind speed value Va is decided in the step S5 to be larger than or equal to ΔV ("YES"), it is decided in the step S12 whether the outside air temperature T obtained in the step S11 is higher than a predetermined level. When the result is that the outside air temperature T is lower than or equal to the predetermined level ("YES"), the process proceeds to the subsequent step S13, where it is decided that the anemometer 7 is in an abnormal state caused by icing. That is, if the outside air temperature T is low, for example, below the freezing point, it can be decided that the probability of causing a fault due to icing, i.e., adhesion of snow or ice to the anemometer 7, is high. In other words, the controller 20 can reliably detect an anemometer fault caused by icing to the anemometer 7, which occurs when the outside air temperature is low, by using a detected value of the outside air temperature T for deciding abnormality in the anemometer 7.

Based on such a decision, in the subsequent step S7, a cut-out signal is outputted as in the case where the outside air temperature T is higher than a predetermined level ("NO"). The process after the output of the cut-out signal in the step S7 is the same as that in FIG. 3.

In the above-described wind turbine generator system 1 of the present invention, it is possible to reliably detect an abnormality in the wind speed V which is the measured value from the anemometer 7 for performing cut-out control. In particular, by adding a condition of outside air temperature T, even in the case of a fault in the anemometer 7, namely, the outputted measured value (wind speed V) being lower than the actual wind speed level due to, for example, icing, the cut-out control can be reliably performed, and therefore the wind turbine generator system 1 can be protected from strong wind. That is, mechanical stress applied to the wind turbine generator system 1 is decreased by reliably performing the cut-out control when the wind is stronger than or equal to the cut-out wind speed.

The present invention is not limited to the above-mentioned embodiments and can be suitably modified without departing from the scope of the present invention.

The invention claimed is:

1. A wind turbine generator system comprising,
a nacelle mounted atop a tower,
a main shaft mounted in the nacelle and having a rotor head to which wind turbine blades are attached, the main shaft and the wind turbine blades integrally rotating,
a gear box attached to the main shaft, and accelerating and outputting the rotation speed of the main shaft,
a generator driven by the output of the gear box, and
a controller that performs cut-out control during strong wind when a measured value from an anemometer is a predetermined level or more, the controller being configured to decide that the anemometer has a fault when a difference of a predetermined level or more occurs between the measured value from the anemometer and an estimated wind speed value obtained from a relationship between a blade-pitch-angle of the wind turbine blades and an output of the generator,
wherein the controller is operatively connected with an outside air temperature sensor and configured to use a detection value of outside air temperature for deciding that the anemometer has a fault.

2. The wind turbine generator system according to claim 1, wherein the controller is configured to perform cut-out control and stops generation of electricity when it is decided that the anemometer has the fault.

3. The wind turbine generator system according to claim 1, wherein the controller is configured to perform cut-out control and stops generation of electricity when it is decided that the anemometer has the fault.

4. A wind turbine generator system comprising,
a nacelle mounted atop a tower,
a main shaft mounted in the nacelle and having a rotor head to which wind turbine blades are attached, the main shaft and the wind turbine blades integrally rotating,
a variable pitch mechanism for changing a pitch angle of the turbine blades,
a gear box attached to the main shaft, and accelerating and outputting a rotation speed of the main shaft,
a generator driven by the output of the gear box,
an anemometer attached to the nacelle, and
a controller that performs cut-out control during strong wind, the controller having means for obtaining a measured value from the anemometer, means for calculating an estimated wind speed value from a relationship between a blade-pitch-angle of the wind turbine blades of the variable pitch mechanism and an output of the generator, and means for determining that the anemometer has a fault when a difference of a predetermined level or more occurs between the measured value from the anemometer and the estimated wind speed value,
wherein the controller is operatively connected with an outside air temperature sensor and configured to use a detection value of outside air temperature for deciding that the anemometer has a fault.

* * * * *